(12) United States Patent
Davidsson

(10) Patent No.: US 6,934,718 B2
(45) Date of Patent: Aug. 23, 2005

(54) CATEGORIZING AND RETRIEVING ITEMS

(75) Inventor: Marcus Davidsson, Linköping (SE)

(73) Assignee: Nokia Corporation, Espoo (FI)

( * ) Notice: Subject to any disclaimer, the term of this patent is extended or adjusted under 35 U.S.C. 154(b) by 302 days.

(21) Appl. No.: 09/971,587

(22) Filed: Oct. 9, 2001

(65) Prior Publication Data

US 2003/0095139 A1 May 22, 2003

(51) Int. Cl.[7] ............................................. G06F 17/30
(52) U.S. Cl. ................................... 707/104.1; 715/968
(58) Field of Search ................................ 715/764, 968; 707/102, 104.1, 3, 5, 7, 104

(56) References Cited

U.S. PATENT DOCUMENTS

| | | | |
|---|---|---|---|
| 6,195,657 B1 * | 2/2001 | Rucker et al. ................. | 707/5 |
| 6,211,871 B1 | 4/2001 | Himmel et al. | |
| 6,243,071 B1 * | 6/2001 | Shwarts et al. ............. | 345/823 |
| 6,247,021 B1 | 6/2001 | Himmel et al. | |
| 6,275,862 B1 * | 8/2001 | Sharma et al. .............. | 709/245 |
| 6,601,173 B1 * | 7/2003 | Mohler ........................ | 713/201 |

FOREIGN PATENT DOCUMENTS

| | | |
|---|---|---|
| WO | 0048057 | 8/2000 |
| WO | 0062169 | 10/2000 |

OTHER PUBLICATIONS

"An Overview of the World Wide Web", *Introduction to Web Systems and Application*, pp. 8–23.

* cited by examiner

*Primary Examiner*—Frantz Coby
*Assistant Examiner*—Haythim Alaubaidi
(74) *Attorney, Agent, or Firm*—Antonelli, Terry, Stout & Kraus, LLP

(57) ABSTRACT

A web browser is configured to categorise book marked web pages. The browser runs a process that provides markers (CM1, 2, 3), which generate marker signals corresponding to individual categories for the content of the web pages. A user interface (21) is operable to allow the user to collocate a selection of the plurality of marker signals with network address data for the web page to be book marked, and also to allow the user to retrieve book marked web pages on the basis of the marker signals collocated to them.

15 Claims, 5 Drawing Sheets

CATEGORIZING AND RETRIEVING ITEMS

FIELD OF THE INVENTION

This invention relates to categorising and retrieving items, particularly but not exclusively book marked web pages.

BACKGROUND OF THE INVENTION

It is well known that data in the form of hypermedia such as hypertext is often written in a hypertext language such as HTML and arranged in web pages that are provided by a server connected through a network to a client. The client may comprise a personal computer or other processing device capable of presenting the data retrieved from the server to a user. The network may comprise the World Wide Web, which comprises many servers connected over the Internet in a web, and web pages have network addresses in the form of universal resource locators (URLs). The web pages include hyperlinks to allow the user to establish a link to other web pages, which may be located on the same or a different server, the linking being achieved by the use of a URL in the web page at the hyperlink.

Web clients typically access the hypermedia information using a browser. An overview of the World Wide Web and HTML is given in chapter 1 of "HTML 3.2 and CGI Unleashed" J. December and M. Ginsberg 1996 (ISBN 1-57521-177-7). Although HTML is usually used to prepare web pages, they can also be created in other mark-up languages. Conventional browsers such as Microsoft Explorer and Netscape Navigator include a book-marking function that allows individual web pages to be book marked. In this way, the network address for a particular web page is cached in a bookmark list so that the web page concerned can be readily located on subsequent occasions. The user may build up a significant number of bookmarks which may make the bookmark list long and confusing, so proposals have been made to categorise the bookmarks according to subject matter categories, e.g. sport, news. Conventional browsers allow bookmarks to be placed in an hierarchical folder structure, in which a main folder is linked to sub-folders. For example, the user may set up folders corresponding to web pages for the category "sport" which may be provided with sub-folders for particular types of sports individually, e.g. swimming and soccer. However, this hierarchical folder structure suffers from a disadvantage that when a particular book marked web page relates to more than one of the folder categories, it needs to be included in more than one folder to enable efficient retrieval, which results in a multiplicity of entries which undesirably take up memory space.

A number of prior art proposals have been made to categorise book marked web pages. For example, U.S. Pat. No. 6,195,657 discloses a categorisation scheme and concerns finding other categories that match a first category based on the content of the categories.

U.S. Pat. No. 6,211,871 concerns a computer that has a number of bookmark sets. These sets are not dynamic combinations that are fixed. They provide a security function that disables the computer from accessing certain sets. U.S. Pat. No. 6,243,071 concerns an electronic book that has a book marking system. Bookmark icons that can be shown on individual book marked pages are described but they are not categorised.

SUMMARY OF THE INVENTION

It is an object of the invention to provide an improved categorisation scheme in which avoids the need to duplicate categorised items in memory.

It is a further object of the invention to provide a categorisation process by which the user can dynamically establish individual categories according to need.

Broadly stated, the present invention provides data processing apparatus for categorising items, comprising markers operable to generate marker signals corresponding to individual categories for the items, and a user interface operable to allow a user to collocate an individual item to be categorised with a selectable plurality of the marker signals corresponding to a user selection of the categories and to retrieve those items that have been collocated with at least one selectable marker signal corresponding to at least one of the individual categories.

The user interface may be operable to permit the user to associate an individual user defined category with an individual one of the markers. Also, the categories associated with the markers may be pre-assigned The categorised and retrieved items may themselves provide access to individual sources of information. For example, the items may comprise book marked web pages but other items may be categorised according to the invention such as items that correspond to TV programs in a TV guide or items of multimedia content in a multimedia database.

The invention also includes a computer program to be run by data processing apparatus in order to achieve the aforesaid categorisation and retrieval of the items.

BRIEF DESCRIPTION OF THE DRAWINGS

In order that the invention may be more fully understood an embodiment thereof will now be described by way of example, with reference to the accompanying drawings in which.

DETAILED DESCRIPTION

Figure 1:
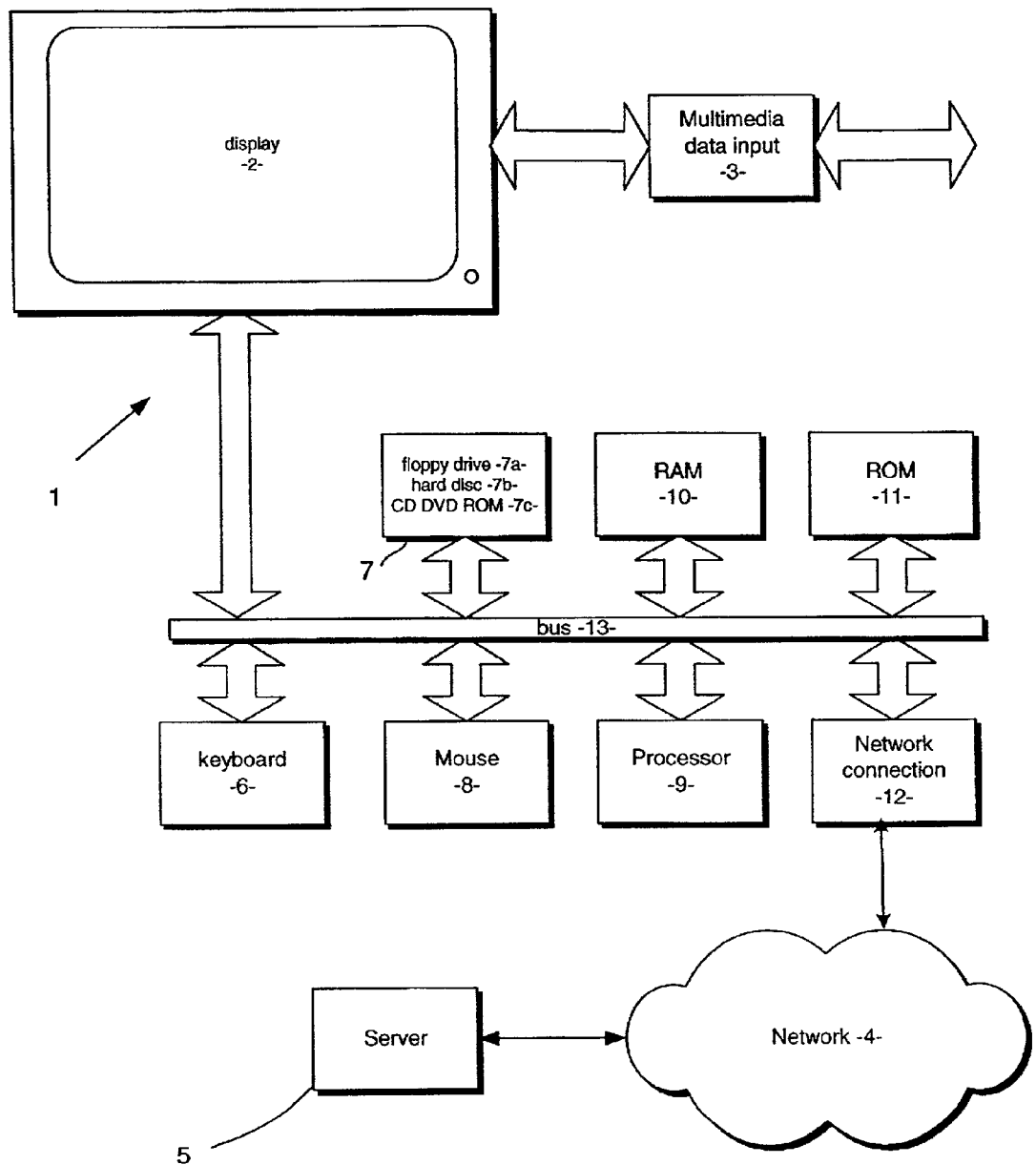
FIG. 1 is a schematic illustration of a multimedia client and server device connected in a network.

FIG. 1 illustrates a multimedia device 1 which may comprise a home entertainment center for displaying audio and video data from a number of different sources such as satellite TV channels, cable, terrestrial broadcast TV and a video recorder. The device has a display monitor 2 such as a cathode ray tube or plasma display, which receives video signals from one or more of the aforementioned sources illustrated schematically as multimedia data input source 3.

Also, the device 1 is configured for use as a personal computer (PC) and is connected by means of a network 4 to a server 5 which may also be a PC or a dedicated server, as well known in the art. The network 4 may comprise the worldwide web (WWW) a LAN or a WAN. Thus, the device 1 can be used to surf the net as will now be described in more detail.

The multimedia device 1 includes keyboard 6, a storage device 7, typically a floppy disc drive 7a, a hard disc 7b, a CD or DVD ROM drive 7c, mouse 8, processor 9, RAM 10, ROM 11 and network connections 12 such as a modem or ISDN interface or other suitable arrangement e.g. through an optical cable link. A common bus 13 as well known in the art interconnects the aforementioned components.

Figure 2:
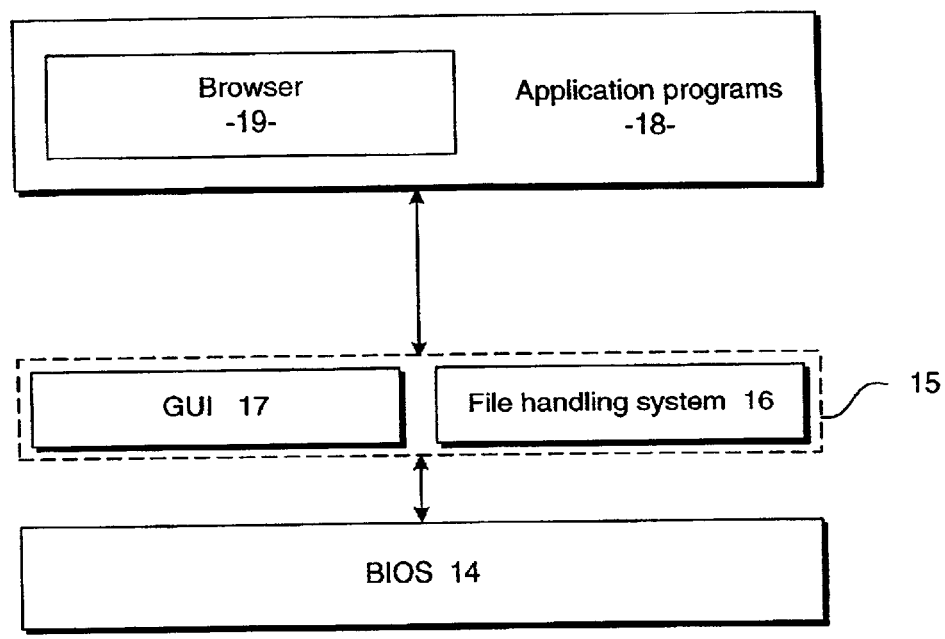
FIG. 2 is a schematic illustration of the software running on the client of FIG. 1.

A schematic illustration of the software running on the device 1 is shown in FIG. 2. As well known in the PC art, a basic input output system (BIOS) 14 provides information interchange between the various components shown in FIG. 1. An operating system 15 controls operation of the BIOS 14. The operating system includes a file handling system 16 and a graphical user interface (GUI) 17. Examples of the operating system 16 are Microsoft™ Windows and Linux.

As well known in the art, programs and data are arranged in files, which are grouped in directories referred to herein as folders and the file handling system 16 of the operating system 15 allows files to be organised in a hierarchical structure.

The GUI 16 provides displays of data and user operable controls to be displayed on the display device 2 which can be manipulated by means of the keyboard 6, the mouse 8 as well known in the art. Also, the device 1 may be provided with a wireless remote controller (not shown) that allows the user to control the GUI 16. It will be understood that the processor 9 and the storage devices 7 may perform functions other than web browsing in the device 1 such as a digital video or replay function.

The operating system 15 allows application programs 18 to be run on the computer. The application programs can take a multiplicity of different forms. In this example, the application programs 18 include a web browser 19 such as Microsoft Internet Explorer, Netscape Navigator, Mozilla or another. As known in the art, these browsers are used to display hypertext media derived from web sites e.g. from web sites at the server 5 shown in FIG. 1. The hypertext information is arranged in web pages which include hyperlinks to allow the user to establish a link to another web page, which may be located on the same or a different server, the routing to the document being achieved by use of a network address in the form of a universal resource locator (URL) in the web page at the hyperlink.

Figure 3:
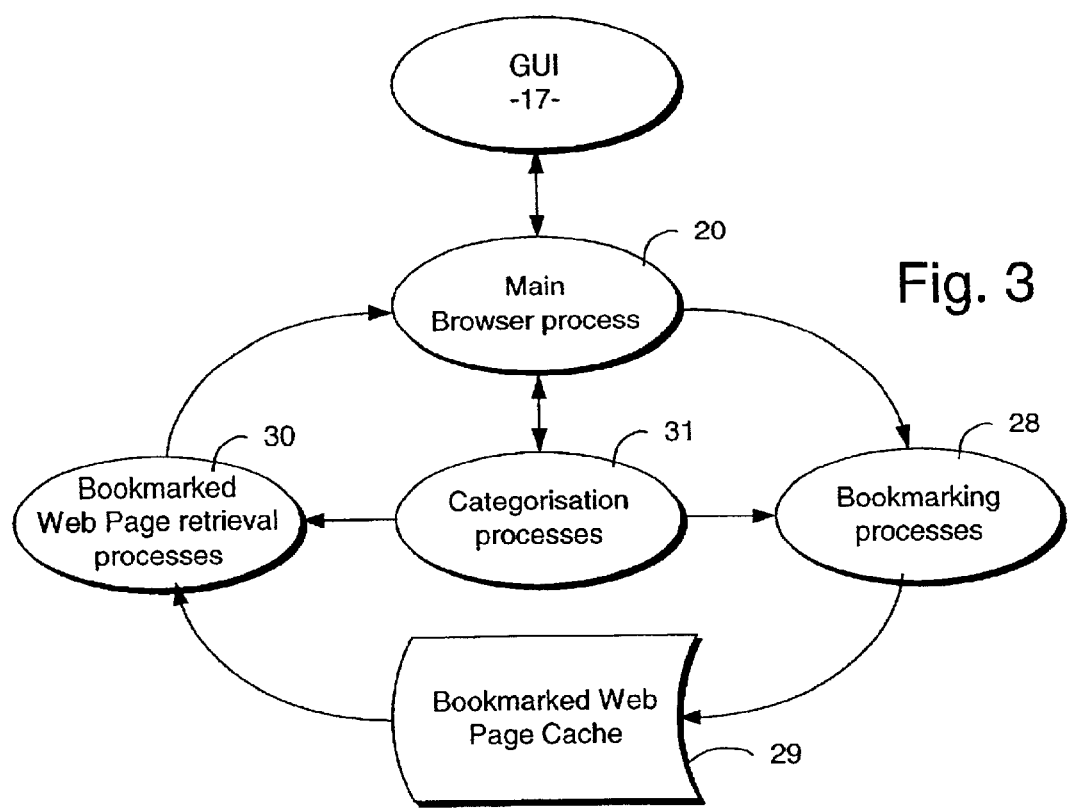
FIG. 3 is a schematic illustration of the processes performed by said browser 19 shown in FIG. 2.
Figure 5:
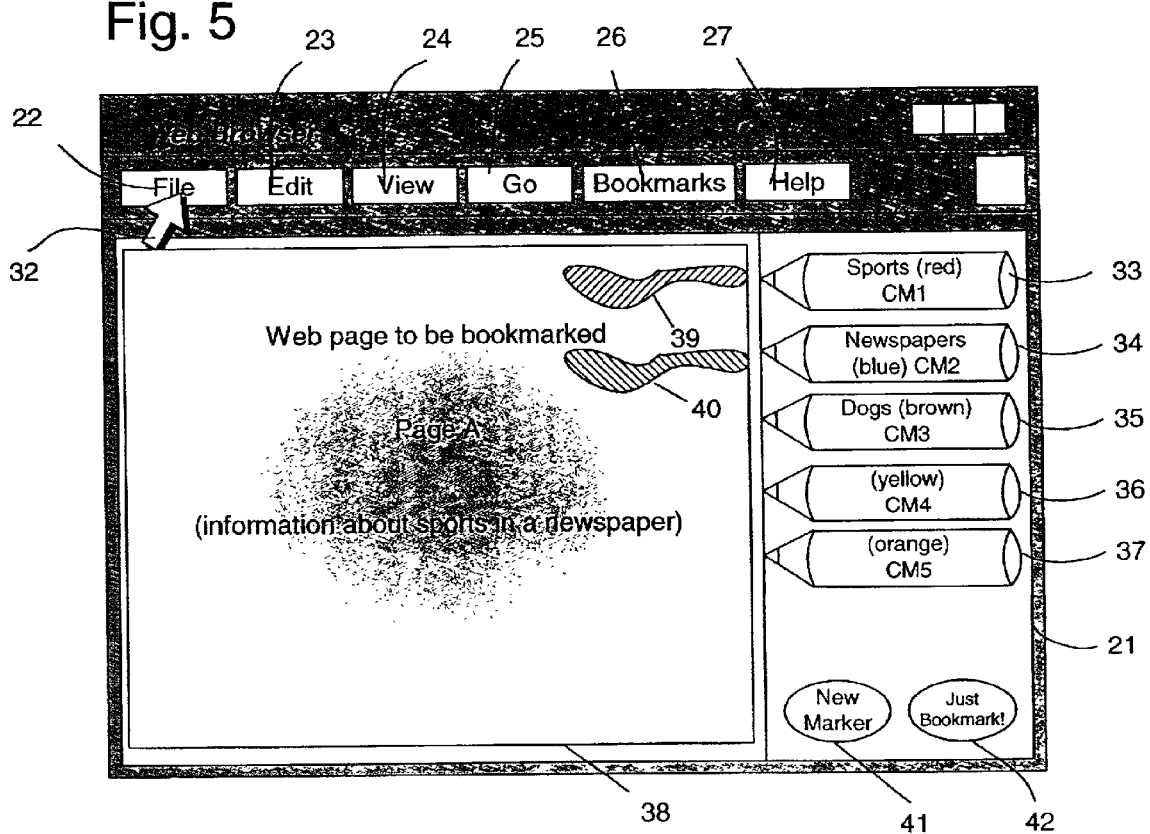
FIG. 5 is a schematic illustration of the graphical user interface provided by the browser in order to facilitate book marking of the web page with the user-selected categorisation.

FIG. 3 illustrates processes performed by the browser schematically. A main browser process 20 is controllable through the GUI 17 to provide a web page display within a browser window 21 on the display device 2 (FIG. 1). As shown in FIG. 5, the browser window 21 includes a number of control buttons, which may be operated using the mouse 8 (or the remote controller) to provide selectable drop down menus, as known in the art. Thus, the browser window 21 includes drop down menu 22 for file functions, menu 23 for editing functions, menu 24 relating to different viewing functions, menu option 25 which commands the browser process to go back to previously visited web pages, menu 26 which actuates a book marking process and menu 27 which provides access to help files.

When the bookmark control button 26 is actuated, the main browser process 20 produces a display as shown in FIG. 5 so that a web page to be book marked can be categorised and cached for subsequent retrieval. Thus, referring to FIG. 3, book-marking process 28 allows data concerning the network address of an individual web page to be book marked and cached in a bookmark web page cache 29. Retrieval of individual web pages is performed by process 30 and data concerning retrieved web page bookmarks are supplied to the main browser process 20 so that a particular web page can then be selected and displayed by clicking on the corresponding thumbnail 43,44 using the mouse cursor 32 shown in FIG. 7.

Figure 4:
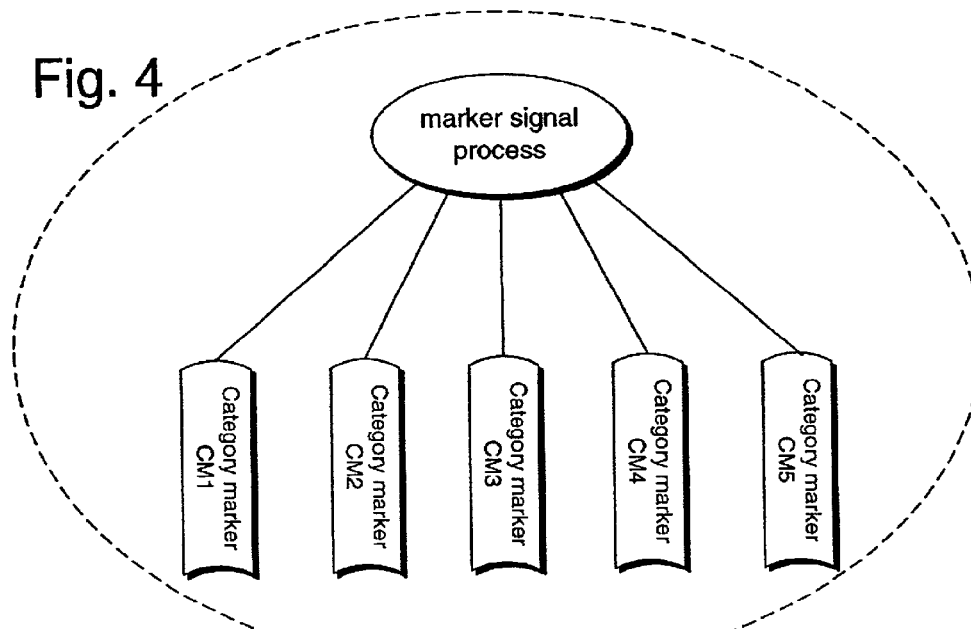
FIG. 4 illustrates the categorisation process of FIG. 3 in more detail.

The book marking process 28 and the retrieval process 30 are carried out in accordance with data from a categorisation process 31, which is shown in more detail in FIG. 4.

The categorisation process is performed by setting up individual categories defined by category markers CM1–CM5 for which the categories can be pre-assigned or user definable. In this example, three pre-defined categories are provided, namely: sports, newspapers and dogs. Category markers CM1, CM2 and CM3 provide category marker signals corresponding to these categories. The categories for category markers CM4 and CM5 can be user defined and if required, further category markers can be set up under the control of the user.

In accordance with the invention, individual marker signals corresponding to the respective categories are collocated with individual web pages to be book marked. This will now be described by way of example with reference to Table 1, which illustrates characteristics of five web pages to be book marked, namely Pages A–E.

TABLE 1

| | | Associated marker signals | | |
|---|---|---|---|---|
| Web page | Content of web page | Sports CM1 | Newspapers CM2 | Dogs CM3 |
| Page A | Newspaper about sports | Yes | Yes | No |
| Page B | Newspaper about dogs | No | Yes | Yes |
| Page C | About sports, but not about dogs and not a newspaper | Yes | No | No |
| Page D | About dogs, but not about sports and not a newspaper | No | No | Yes |
| Page E | About canine sports but not a newspaper | Yes | No | Yes |

Considering for example Page A, the content of the web page comprises a newspaper article about sports. Thus, it falls within the categories of both sports and newspapers. Therefore, in accordance with the invention, the marker signals from markers CM1 and CM2 can be collocated with bookmark data for Page A. Similarly, bookmark data for Page B, which is a newspaper article about dogs, relates to both newspapers and dogs and can be collocated with marker signals from markers CM2 and CM3. Similarly, bookmark data for Pages C, D and E can be collocated with one or more of the marker signals from markers CM1–CM3 depending on the content of the page concerned.

An example of the data cached in cache 29, as stored, book marked data for web Page A is shown in Table 2.

TABLE 2

| Stored Bookmark data - Web Page A | | | | | | |
|---|---|---|---|---|---|---|
| URL - Page A | Thumbnail data | CM1 = 1 | CM2 = 1 | CM3 = 0 | Spare | Spare |

The data comprises the network address for Page A, namely its URL, together with thumbnail data, which provides a precis of the content of the page concerned. Also, the data comprises marker flags corresponding to the marker signals from markers CM1–CM3. The marker signals are set either to binary 1 or 0 depending on whether an appropriate marker signal is to be collocated with the network address and thumbnail data. The marker signals comprise binary data for which "1"="Yes" in Table 1, whereas "0" represents "No" in Table 1. The data structure shown in Table 2 includes additional spare data locations for additional marker signals to accommodate user-defined marker signal categories, e.g. from markers CM4, CM5.

It will be understood that each of the book marked web pages give rise to stored book marked data that is held in the web page cache 29 shown in FIG. 3 with a data structure as shown in Table 2.

The categorised, stored book marked data has an advantage over prior categorisation techniques that make use of higher article folder structures. For example, if individual folders were provided for book marked web pages concerning sports, newspapers and dogs, pages that relate to more than one category would need to be cached twice in the individual folders. For example, Page A would need to be cached in both the folder for newspapers and the folder for sports. In accordance with the invention, only one set of cached data is needed.

An example of the book marking process 28 and a subsequent retrieval process 30 will now be described with reference to FIGS. 5 to 8. FIG. 5 illustrates the web browser when mouse cursor 32 has operated the bookmark button 26. In this situation, categorisation buttons 33–37 corresponding to the category markers CM1–CM5 are displayed. The GUI 17 displays the buttons 33–37 graphically as marker pens, which can dispense different coloured marker inks onto the web page to be book marked. In this example, the marker pen 33, which relates to sports, provides a graphical representation of red ink whereas marker pen 34, which relates to newspapers, provides blue ink. In this example, web Page A is displayed in window 38, ready to be book marked. The user wishes to categorise the web page in terms of both sports and newspapers and so the mouse cursor 32 is moved to operate buttons 33 and 34 so as to dispense a graphical representation of both red and blue ink 39, 40 onto the web page displayed in window 38. Also, the processor 9 runs a book marking process 28 such that book marked data corresponding to Table 2 is stored in the book marked web page cache 29 shown in FIG. 3. To this end, thumbnail data corresponding to a precis of the web page to be book marked is assembled in a manner known per se and attached to the URL for Page A. Also, the marker signal flags CM1=1, CM2=1 and CM3=0 are collocated with the URL and the thumbnail data.

Additionally, the user may wish to categorise web pages according to further categories, in which case "a new marker" button 41 is operated, which permits user defined categories to be associated with the individual markers, e.g. CM4, CM5 and, if appropriate, further markers can be displayed with further user defined categories. In some circumstances, it may be appropriate to bookmark a web page without using the category marker signals, in which case the user operates control button 42.

It will understood that in this example, each of the web Pages A–E are appropriately categorised and cached in accordance with the data structure of Table 2, in cache 29 of FIG. 3.

Figure 6:
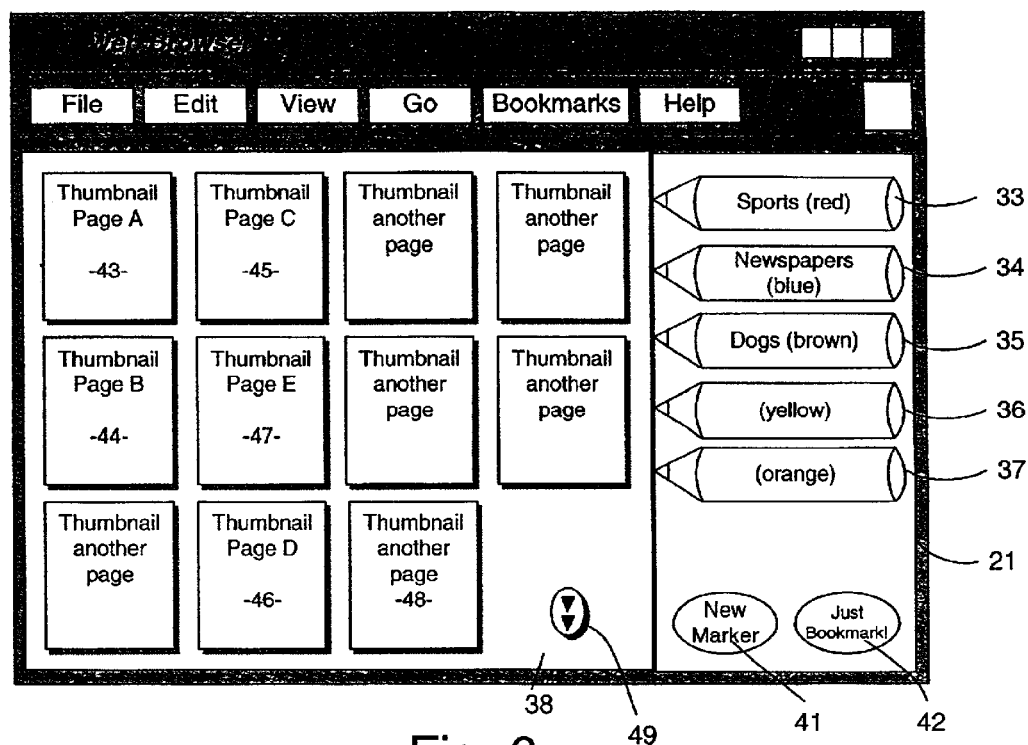
FIG. 6 illustrates a browser when book marked web pages are retrieved.

The book marked web page retrieval process 30 will now be described in more detail with reference to FIGS. 6, 7 and 8. When the retrieval processes commences, browser window 21 is displayed and the window 38 displays thumbnails of each of the book marked web pages. As shown in FIG. 6, thumbnail 43 for Page A is displayed together with corresponding thumbnails 44–47 corresponding to Pages B–E. It will be understood that bookmark Pages A–E have been categorised with marker signals as previously described. Additionally, a number of uncategorized book marked web paged have been stored in cache 29 and corresponding thumbnails are also displayed, for example thumbnail 48. If not all of the thumbnails fit within window 38, a scroll control 49 is displayed in order to provide further display space.

Figure 7:
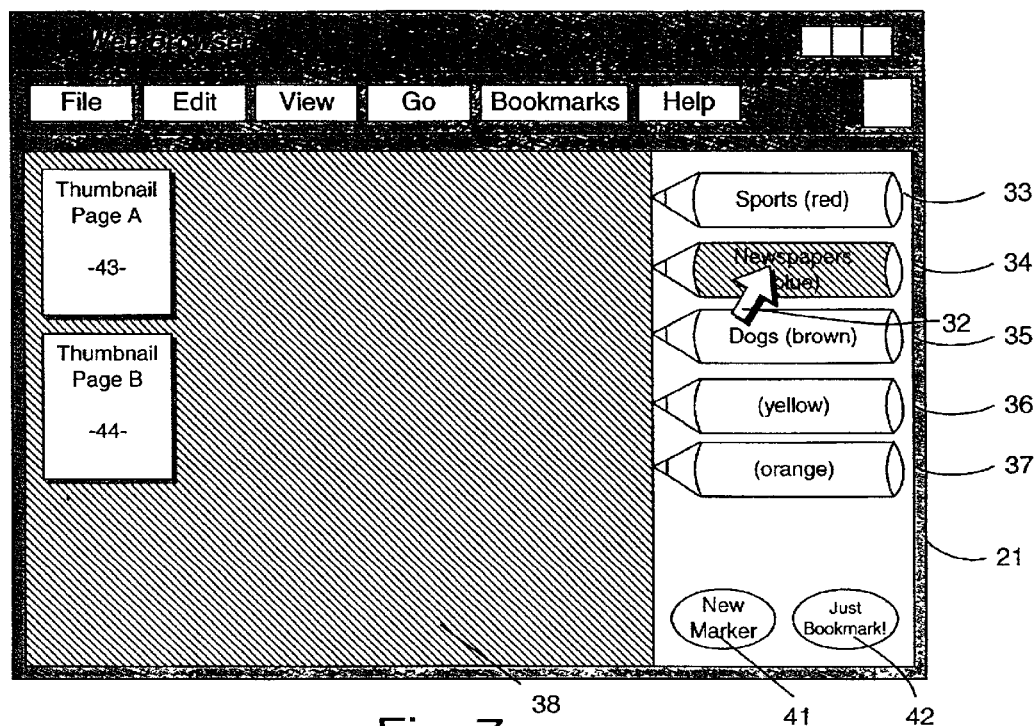
FIG. 7 illustrates a browser when the retrieved book marked web pages are selected according to an individual category.
Figure 8:
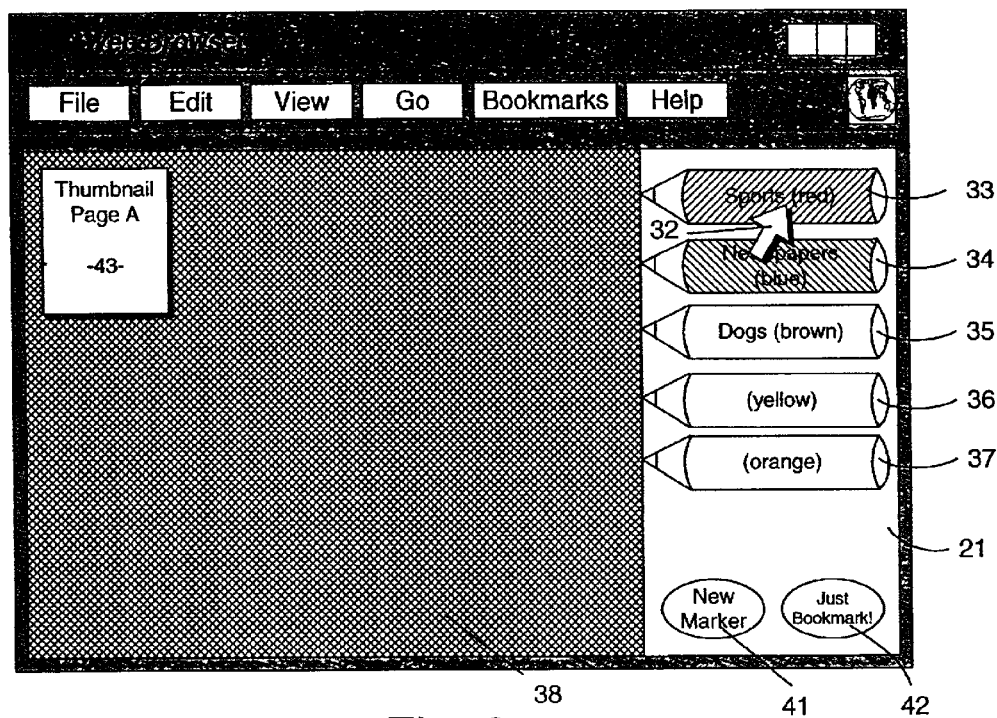
FIG. 8 illustrates a browser when the book marked web pages are selected according to two categories.

Referring to FIG. 7, if the user wishes to select thumbnails for bookmark web pages that have been categorised in the "newspaper" category, the user actuates marker pen 34 with the mouse cursor 32 as a result of which the process 30 causes the marker to change to a blue colour and the background of window 48 also turns blue to simulate a sea of blue ink. Process 30 is supplied with a marker signal from categorisation marker CM2 corresponding to marker pen 34 and selects for display stored bookmark data which contains the associated marker flag CM2=1. All other thumbnails are omitted from the display. A routine may be included to provide a visual effect whereby the omitted thumbnails effectively "float" out of view on the sea of blue ink.

The user may then wish to select thumbnails for cached bookmarks categorised both as newspapers and sports. Then, as shown in FIG. 8, the user actuates marker pen 33 with the mouse cursor 32, in addition to marker pen 34. The marker pen 33 turns red under the control of the web page retrieval process 30 and the window 38 displays a background that is a combination of the colours of the actuated marker pens 33,34. Marker signals from category markers CM1 and CM2 are supplied by the categorisation process 31 to the retrieval process 30 which then searches through the stored bookmark data to identify bookmarks for which both CM1=1 and CM2=1. As can be seen from Table 1, in this example, only Page A satisfies this criterion and so, as shown in FIG. 8, only thumbnail sketch 43 corresponding to Page A is displayed.

The user can click on a desired thumbnail using the mouse cursor 32 anytime during the retrieval operation in order to go to the URL corresponding to a particular web page and thereby retrieve the web page concerned and display it in the browser.

The user can always deactivate a marker pen that has been previously actuated. The retrieval process 30 will be reiterated in the same manner as if one less marker had been actuated.

Figure 9:
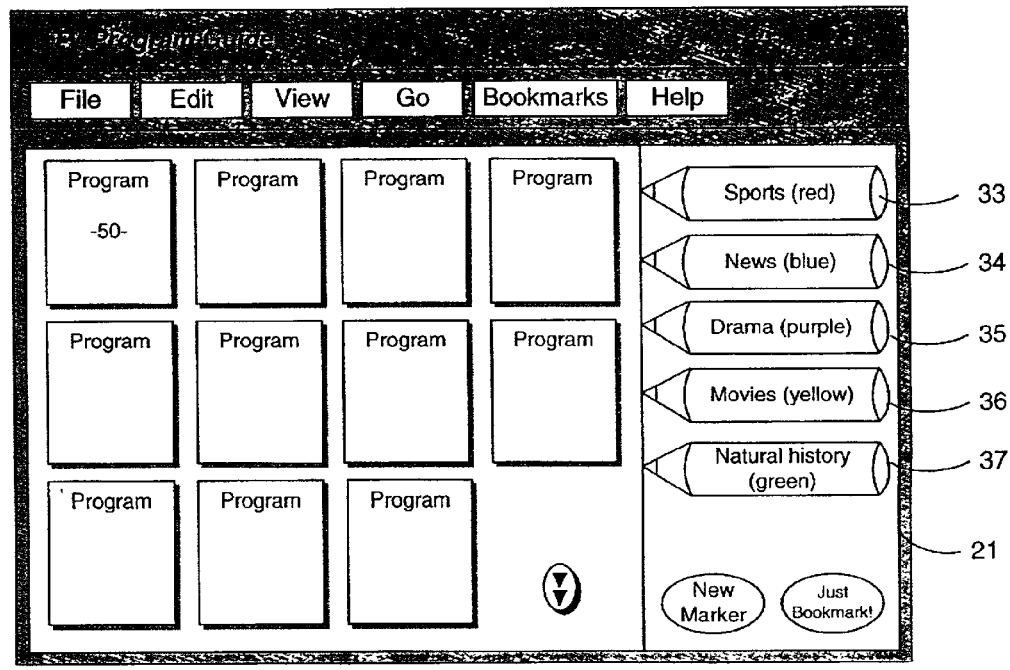
FIG. 9 illustrates the web browser when configured to categorise and retrieve TV programs.

The book marked items need not necessarily be web pages. For example, as shown in FIG. 9, the book marking and retrieval processes 28, 30 may be used to bookmark program information in a TV program guide in order to enable the user to categorise links to TV programs which may be stored in the storage medium 7 for display. Each bookmark program is provided with associated stored bookmark data in cache 29, which can be categorised according to categorisation process 31 during book marking. As a result, thumbnails 50 can be displayed and can be categorised during book marking according to user-defined categories of TV program, e.g. sports, news, drama, movies and history. The marker pens 33–37 corresponding to the markers CM1–CM5 are appropriately labelled, as shown in FIG. 9. The retrieved thumbnail 50 can be displayed according to the predefined categories in a manner previously described for web pages and, when an individual program is selected, the stored data corresponding to the program may be retrieved from the storage device 7 shown in FIG. 1. In an alternative embodiment, the thumbnail data 50 corresponds to broadcast programs and may be used to set a video recorder for recording the broadcast program.

What is claimed is:

1. Data processing apparatus for categorizing items comprising:

a user input device;

a graphical user interface including first and second sections; and processing circuitry operable to display an electronic reference to an item to be categorized in the first section of the graphical user interface and to display a plurality of markers in the second section, wherein each of said plurality of markers is configured for applying a different individual indicium, each individual indicium being associated with an individual category from the plurality of categories; and wherein the circuitry being operable to generate marker signals corresponding to individual categories for said item when a user utilizes the user interface to select markers from said plurality of markers, whereby the data corresponding to said item to be categorized is collocated with a selection of said plurality of categories corresponding to the selected markers;

the circuitry being operable to display an individual indicium in the first section of the graphical user interface when a marker signal is generated for an item, wherein said individual indicium is associated with the category corresponding to said marker signal; and said user interface being operable to retrieve those items that have been collocated with at least one said selectable marker signals corresponding to at least one of said individual categories.

2. Apparatus according to claim 1 wherein the categories associated with the markers are pre-assigned.

3. Apparatus according to claim 1 wherein the user interface is operable to permit the user to associate an individual user defined category within individual one of the markers.

4. Apparatus according to claim 1 operable to categorize and retrieve items which themselves provide access to individual sources of information.

5. Apparatus according to claim 4 operable to categorize items that comprise bookmarked web pages.

6. Apparatus according to claim 4 operable to categorize items that correspond to TV programs for a TV guide.

7. Apparatus according to claim 4 operable to categorize items that correspond to items of multimedia content in a multimedia database.

8. Apparatus according to claim 1 operable to cache data corresponding to the individual item to be categorized together with individual collocated flag signals representing the selected marker signals.

9. Apparatus according to claim 8 wherein the cached data comprises a network address, thumbnail data comprising a précis of the data to be found at the address, and data corresponding to the flag signals.

10. The apparatus of claim 1, wherein:

said user interface is operable to retrieve those items that have been collocated with at least one selectable marker signal corresponding to at least one of said individual categories by selecting those markers configured for applying individual indicia associated with the at least one of said individual categories retrieving those items that have been collocated with the at least one of said individual categories, and displaying electronic references to said items in the first section of the graphical user interface.

11. The apparatus according to claim 1 comprising a browser operable to perform a bookmarking process, a categorization process and a retrieval process controllable by the graphical user interface.

12. A method of operating data processing apparatus to categorize items having an associated user input device and a graphical use interface, wherein an electronic reference to an item to be categorized is displayed in a first section of the graphical user interface and a plurality of makers are displayed in a second section of the graphical user interface, wherein each of said plurality of markers is configured for applying a different individual indicium, each individual indicium being associated with an individual category from a plurality of categories, and each image can be selected by the user input device, comprising:

generating marker signals corresponding to individual categories for said item when a user selects images from said plurality of images, whereby the data corresponding to said item to be categorized is collocated with a selection of said plurality of categories corresponding to the selected images; and displaying an individual indicium in the first section of the graphical user interface when a marker signal is generated for an item, wherein said individual indicium is associated with the category corresponding to said marker signal; and operating said interface to retrieve those items that have been collocated with at least one selectable marker signal corresponding to at least one of said individual categories.

13. The method of claim 12, wherein said operating of said interface to retrieve those items that have been collocated with at least one selectable marker signal corresponding to at least one of said individual categories comprises:

selecting those markers configured for applying individual indicia associated with the at least one of said individual categories;

retrieving those items that have been collocated with the at least one of said individual categories; and displaying electronic references to said items in the first section of the graphical user interface.

14. A computer program product to be run by data processing apparatus to categorize items having an associated user input device, the program providing a graphical user interface including first and second sections, wherein an electronic reference to an item to be categorized is displayed in a first section of the graphical user interface and a plurality of markers are displayed in a second section of the graphical user interface, wherein each of said plurality of markers is configured for applying a different individual indicium, each individual indicium is associated with an individual category from a plurality of categories, and each marker can be selected by the user input device; and the program further including instructions for generating marker signals corresponding to individual categories for said item when a user selects markers from said plurality of markers, whereby the data corresponding to said item to be categorized is collocated with a selection of said plurality of categories corresponding to the selected markers, and displaying an individual indicium in the first section of the graphical user interface when a marker signal is generated for an item, wherein said individual indicium is associated with the category corresponding to said marker signal, and operating said interface to retrieve those items that have been collocated with at least one selectable marker signal corresponding to at least one of said individual categories.

15. The computer program product of claim 14 further including instructions for retrieving those items that have been collocated with at least one selectable marker signal corresponding to at least one of said individual categories when the user selects those markers configured for applying individual indicia associated with the at least one of said individual categories, the instructions including retrieving those items that have been collocated with the at least one of said individual categories, and displaying electronic references to said items in the first section of the graphical user interface.

* * * * *